US006530039B1

(12) United States Patent
Yang

(10) Patent No.: US 6,530,039 B1
(45) Date of Patent: Mar. 4, 2003

(54) PORTING ENGINE FOR TESTING OF MULTI-LINGUAL SOFTWARE

(75) Inventor: Feng Yang, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/332,231

(22) Filed: Jun. 14, 1999

(51) Int. Cl.⁷ .................................................. H02H 3/05
(52) U.S. Cl. .............................. 714/38; 704/8; 704/9; 704/10; 717/126
(58) Field of Search .................... 714/38, 26; 704/10, 704/8, 9; 717/126

(56) References Cited

U.S. PATENT DOCUMENTS

| | | | | |
|---|---|---|---|---|
| 4,729,096 A | * | 3/1988 | Larson | 717/126 |
| 5,295,068 A | * | 3/1994 | Nishino et al. | 704/10 |
| 5,347,518 A | * | 9/1994 | Lee | 717/126 |
| 5,390,314 A | * | 2/1995 | Swanson | 717/5 |
| 5,428,772 A | * | 6/1995 | Merz | 707/4 |
| 5,432,935 A | * | 7/1995 | Kato et al. | 358/1.16 |
| 5,572,668 A | * | 11/1996 | See et al. | 714/32 |
| 5,669,000 A | * | 9/1997 | Jessen et al. | 717/127 |
| 5,678,039 A | * | 10/1997 | Hinks et al. | 707/4 |
| 5,754,755 A | * | 5/1998 | Smith, Jr. | 714/38 |
| 5,903,859 A | * | 5/1999 | Stone et al. | 717/126 |
| 5,963,205 A | * | 10/1999 | Sotomayor | 707/531 |
| 6,047,299 A | * | 4/2000 | Kaijima | 704/10 |
| 6,345,245 B1 | * | 2/2002 | Sugiyama et al. | 704/10 |

OTHER PUBLICATIONS

Petzold, Charles; Programming Windows, Fifth Edition; 1999: Chapter 21–Dynamic–Link Libraries.*

* cited by examiner

*Primary Examiner*—Robert Beausoleil
*Assistant Examiner*—Michael Maskulinski
(74) *Attorney, Agent, or Firm*—Banner & Witcoff, Ltd.

(57) ABSTRACT

The present invention is a system and method for testing various language versions of an application program using a single test script. An internal dictionary and/or an external dictionary are used to provide translations of command strings from one language to the specific language of the application program. The test script may then be translated at run time using the dictionaries to allow the testing program to test the application program in accordance with the language of the application program. Fuzzy match logic may be used to provide appropriate language translation of the command string. The internal dictionary may be automatically updated at run time so that it may learn language translations of unknown command strings for future runs.

37 Claims, 9 Drawing Sheets

```
[MR Port Options]
AutoExpend=1
Allow Original String=1
ErrorLog=1
Learning Mode=1
List Candidate=1
Show Config Dialog=1
OS Language=CHT
Confirm New Translation=1

[US]
MainDictionary=c:\MRPORT.CSV
SecondaryDictionary=
Log File=c:\MRPORT.LOG

[CHT]
MainDictionary=c:\MRPORT.CSV
SecondaryDictionary=c:\nt4cht.csv
Log File=c:\MRPORT.LOG
```

Figure 8

```
Warning: MR_WFndWnd "Untitled - Notepad" not found.
----HWND 2004a:NetDDE Agent
----HWND be03ae:未命名-記事本
----HWND f03d4:test.txt-記事本
----HWND 10330:Controls
----HWND 40236: Properties
----HWND 40266:MRPort - Microsoft Developer Studio - [MRPort
----HWND 1007e:檔案總管 - Mrport
----HWND 90226:DDE Server Window
```

Figure 9

PORTING ENGINE FOR TESTING OF MULTI-LINGUAL SOFTWARE

TECHNICAL FIELD

The present invention relates to systems and methods for testing application programs, and more particularly to systems and methods for testing application programs having multiple versions based on language.

BACKGROUND OF THE INVENTION

A critical aspect to developing application programs is to ensure that it is free from programming errors or "bugs". Developers of application programs therefore conduct extensive testing to "de-bug" the application program. One technique for de-bugging application programs is to use test scripts, which are computer programs that automatically test application programs for bugs. A test script allows a developer to automatically simulate mouse and keyboard activities targeted to drive the application program in a certain way. For example, a test script for automatically creating and sending a mail message may simulate the following steps: find an application program titled Outlook, click on the menu item "New Message", find the new window with "Message" in the title, type "John Doe" in the "To:" field, type "Application for a patent" in the "Subject:" field, type some text in the main text control, click on the "Send" button, and click on the "OK" button. A testing program, such as Visual Test, reads this specification of events from the test script and sends a simulation of the events to the application program for testing. The developer may thereby see how the application program processes these events to determine whether the program is functioning properly and to de-bug the program if necessary.

Application programs are commonly written for use around the world and are available in different versions based on country and language. Each version of the application program must therefore be designed to conform to the language and customs of each country. Unfortunately, each version of the application program must be separately tested for bugs and a separate test script for each version of the program must be created. Typically, a master test script is prepared which is then manually translated into different test scripts for each version of the program. An application program may have as many as 40–60 different versions based on language. A like number of test scripts must therefore be created to test each version separately.

Automatic translation software techniques are not practical to translate the test scripts since different versions vary in the translation depending upon the use. For example, the button "yes" may translate differently in other languages depending upon the particular language. Further, the application program may be implemented in a mixed environment. For example, the Chinese version of Microsoft Office® may be implemented on an English version of Microsoft Windows® both of which are developed by Microsoft Corporation of Redmond, Wash. Thus, the translation may vary depending upon whether the command was for the operating system or the application program. Another problem with having different test scripts for each version of an application program is that the application program is continually changing as it is being developed. Accordingly, each time that the application program is changed, the test script for each version must also be changed. A considerable amount of developer time is spent in updating the test scripts.

It is therefore desirable to test each version of an application program more efficiently without requiring different test scripts to be created to test each version of the program. It is also desirable to provide a system and method to translate test scripts automatically so that it may test various versions of an application program. Such techniques would reduce the development time and cost for developing an application program.

SUMMARY OF THE INVENTION

A primary aspect of the invention provides a method and system for testing of different versions of application programs using a single test script. One or more dictionaries are used to provide translations of command strings from one language to the specific language of the application program. The test script may then be translated at run time using the dictionaries to allow the testing program to test the application program in accordance with the language of the application program. Fuzzy match logic may be used to provide appropriate language translation of the command string. A dictionary may be automatically updated at run time so that it may learn language translations of unknown command strings for future runs. Advantageously, the developer need only prepare a single test script in one language to test the various language versions of the application program. Although a separate dictionary is required for each language version, the same dictionaries may be used to translate test scripts for other application programs.

The present invention may be implemented as a set of wrapper functions for a testing program. The present invention may be an add-on to a testing program or may be incorporated within the testing program.

BRIEF DESCRIPTION OF THE DRAWINGS

The present invention is illustrated by way of example and not limitation in the accompanying figures in which like reference numerals indicate similar elements and in which:

FIG. 8 is an exemplary .INI file depicting the initial configurations of the porting engine of the present invention; and FIG. 9 illustrates a sample log after the translation operation of the present invention has run.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
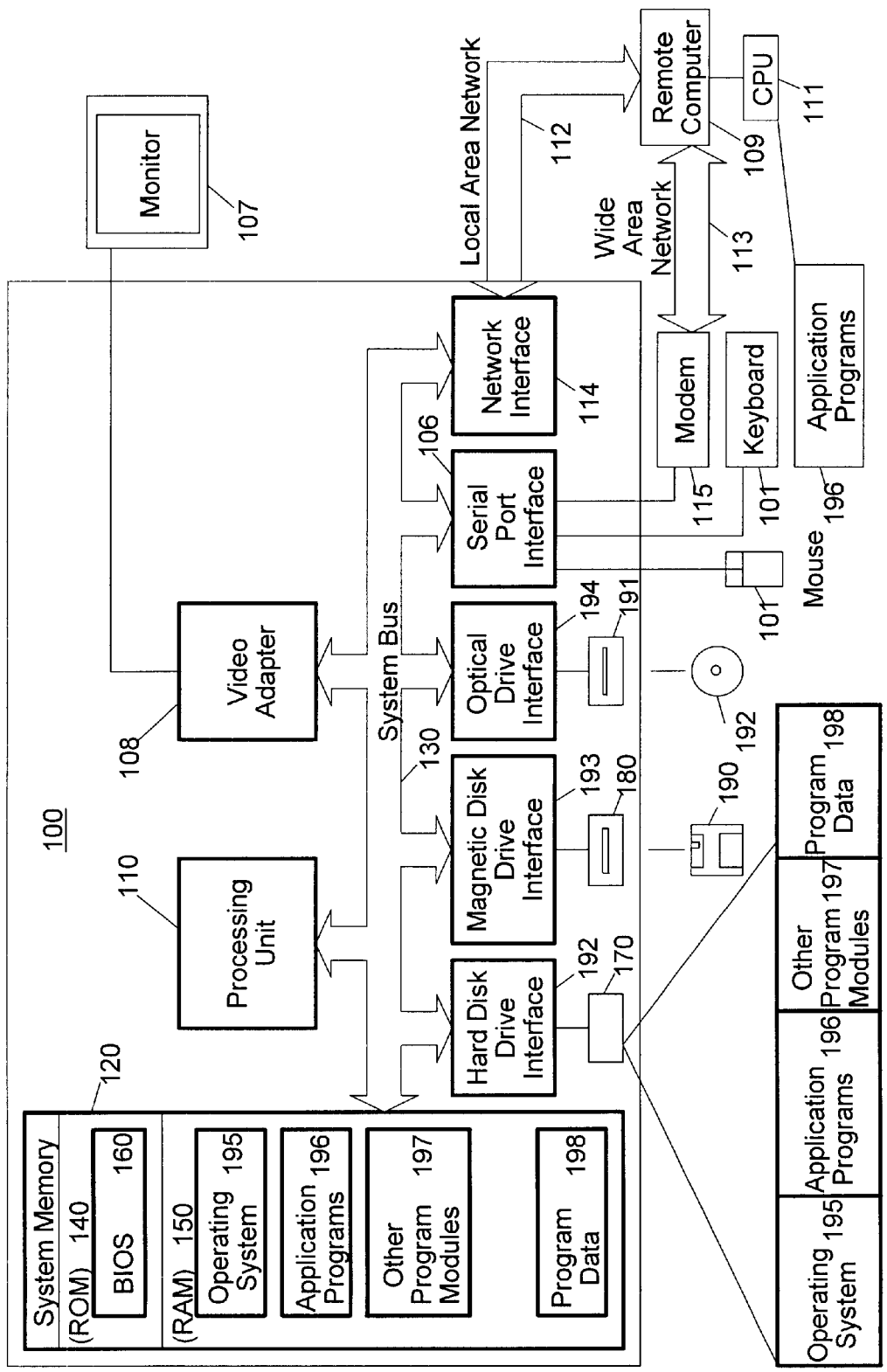
FIG. 1 is a schematic diagram of a conventional general-purpose digital computing environment that can be used to implement various aspects of the present invention.

It will be recognized that the simplified layout described below is intended to illustrate some of the possible methods and systems for translating test scripts. FIG. 1 is a schematic diagram of a conventional general-purpose, digital-computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other means of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

Figure 2:
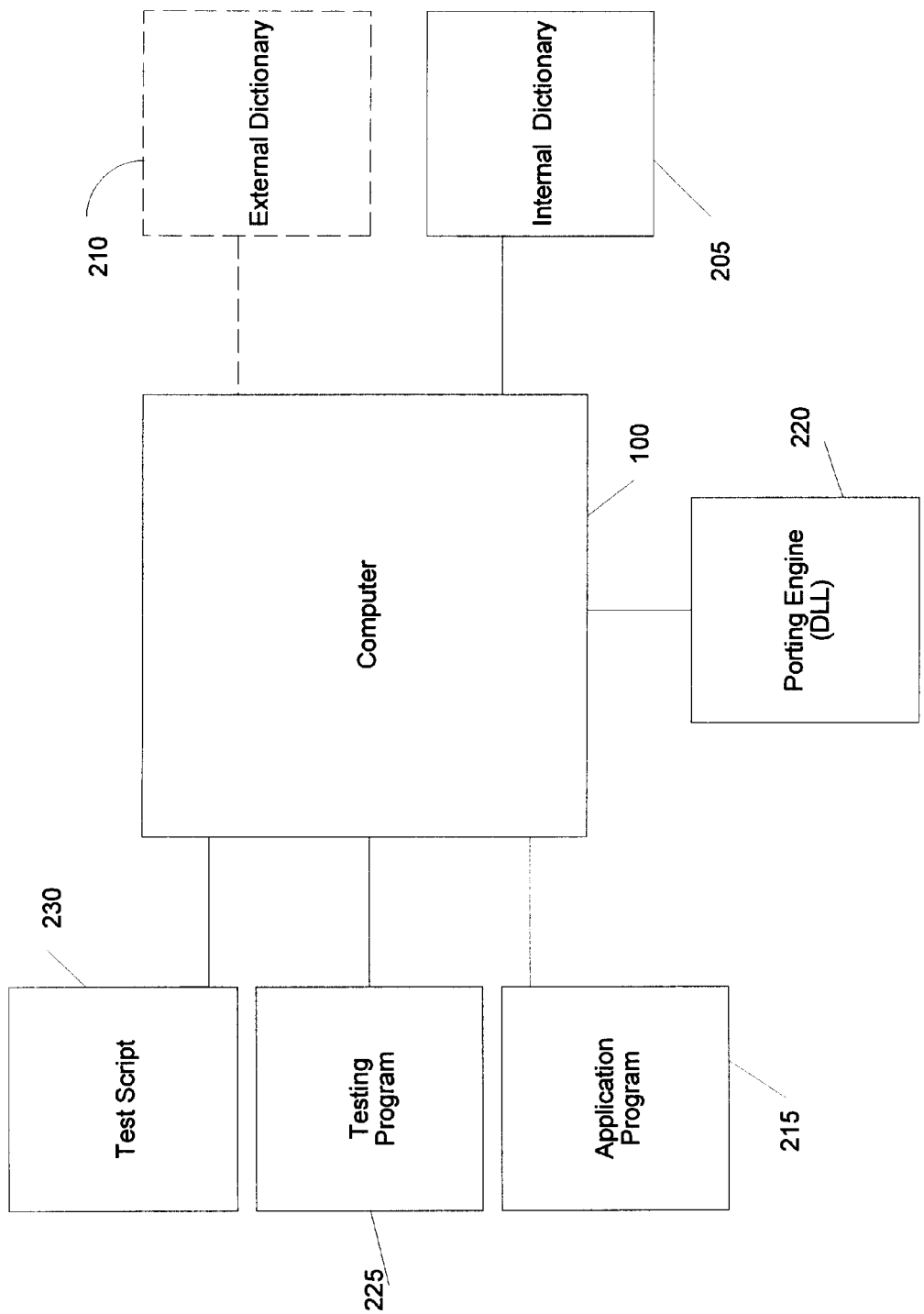
FIG. 2 is a schematic diagram of a computing system in accordance with a preferred embodiment of the present invention.
Figure 6:
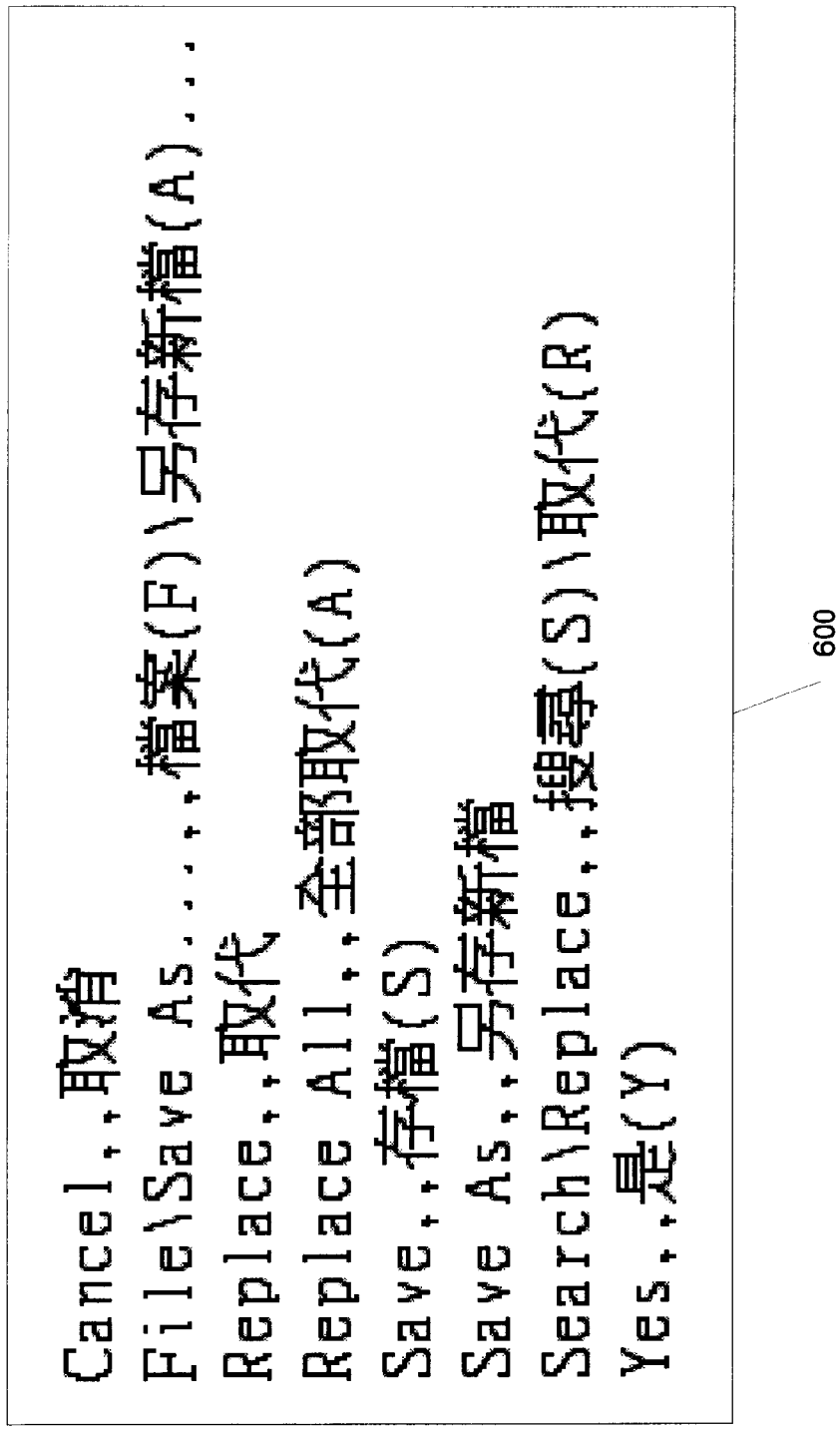
FIG. 6 is portion of an exemplary internal dictionary in CSV format.

FIG. 2 is a schematic diagram of a computing environment in accordance with the present invention. Associated with computer 100 is an internal dictionary 205. Internal dictionary 205 is preferably loaded into system memory 120 from magnetic disk 190 or over a network (with any updates saved to the file). Alternatively or additionally, an external dictionary 210 may be used. External dictionary 210 serves as another source for translation in the event that the internal dictionary 205 does not have a translation for a particular command string. External dictionary 210 is preferably stored in an optical disk 192. Internal and external dictionaries 205 and 210 are preferably in Comma Separated Value (CSV) format as illustrated in FIG. 6, though any format may be used. CSV format is preferred for simplicity and ease of editing. As shown in FIG. 6, the original string in the dictionary is listed first and the translated term is the corresponding term on that line. Any other columns or terms may be ignored. A test script 230, a testing program 225, an application program 215, and a porting engine 220 may be stored in system memory 120 in computer 100. Testing program 225 may be any testing program including, for example, Visual Test. Application program 215 is the program under development that is to be tested using the techniques of the present invention.

Porting engine 220 provides the functionality of the present invention and may implemented within testing program 225 or may be an add-on to testing program 225 (the implementations of FIGS. 3 and 4 below envision the porting engine 220 as being an add-on). In general, the porting engine 220 intercepts at run time command strings in a test script 230, translates them (using internal and/or external dictionaries) into a corresponding localized command string, and then provides the localized command string to the testing program 225 to simulate the commands on the application program 215. The porting engine 220 of the present invention may be implemented within a Dynamic Link Library (DLL) file or generally any file having a library of executable functions that can be used by the testing program 225. The testing program 225 may thereby access the wrapper functions of the DLL file via a static or dynamic link.

For all the functions supported by testing program 225 that utilize a "command string" as a parameter, the present invention provides a corresponding wrapper function for the testing program function. For example, Visual Test has a function called WbuttonClick( ). The present invention thereby provides a wrapper function called MR_WbuttonClick( ) for that function. These functions for the testing program may be edited while test script 230 is being written by the developer, may be converted later by performing global string replacements, or may be converted using a utility program. Accordingly, when test script 230 is run, it will call the wrapper functions of the present invention, in porting engine 220, instead of calling the original function for the testing program 225. Porting engine thereby intercepts the command strings passed as parameters to these functions, do the translation and call the original version of the function in testing program 225.

The above steps are only required when the present invention implemented as add-on to the testing program 225. If porting engine 220 implemented in the testing program 225, these steps are not required. In this alternative preferred embodiment, the translation function would be implemented in the original functions of the testing program 225 and test script 230 can call them directly.

The internal dictionary 205 originally may not have many translations for the command strings to be translated. Accordingly, the internal dictionary 205 may need to be updated with translations during the first few runs. More that one run may be required to account for various test paths that may be taken to perform any given function. Each time the testing script 230 is run, the result and test path may not be the same and it may change due to changes in the files and/or other environmental changes in the computer. For example, when test running the "save file to a network server" function, the server may or may not be available. As a result, the possible test paths may be tested for by running the test script more than once.

As preferred, the porting engine 220 of the present invention may have a learning mode specifically for the purpose of inputting translations into the internal dictionary 205. This may be achieved as shown in FIG. 3 and 4 (discussed below) where the internal dictionary 205 is updated with translations that the user manually provides when queried by the GUI of FIG. 5. The learning mode may also be implemented by having both the external and the internal dictionaries 205 and 210 searched for each command string to identify all translations for the command string. The internal dictionary may then be updated with one or more of these translations. This accounts for the case where more than one translation exists for a command string.

Figure 7:
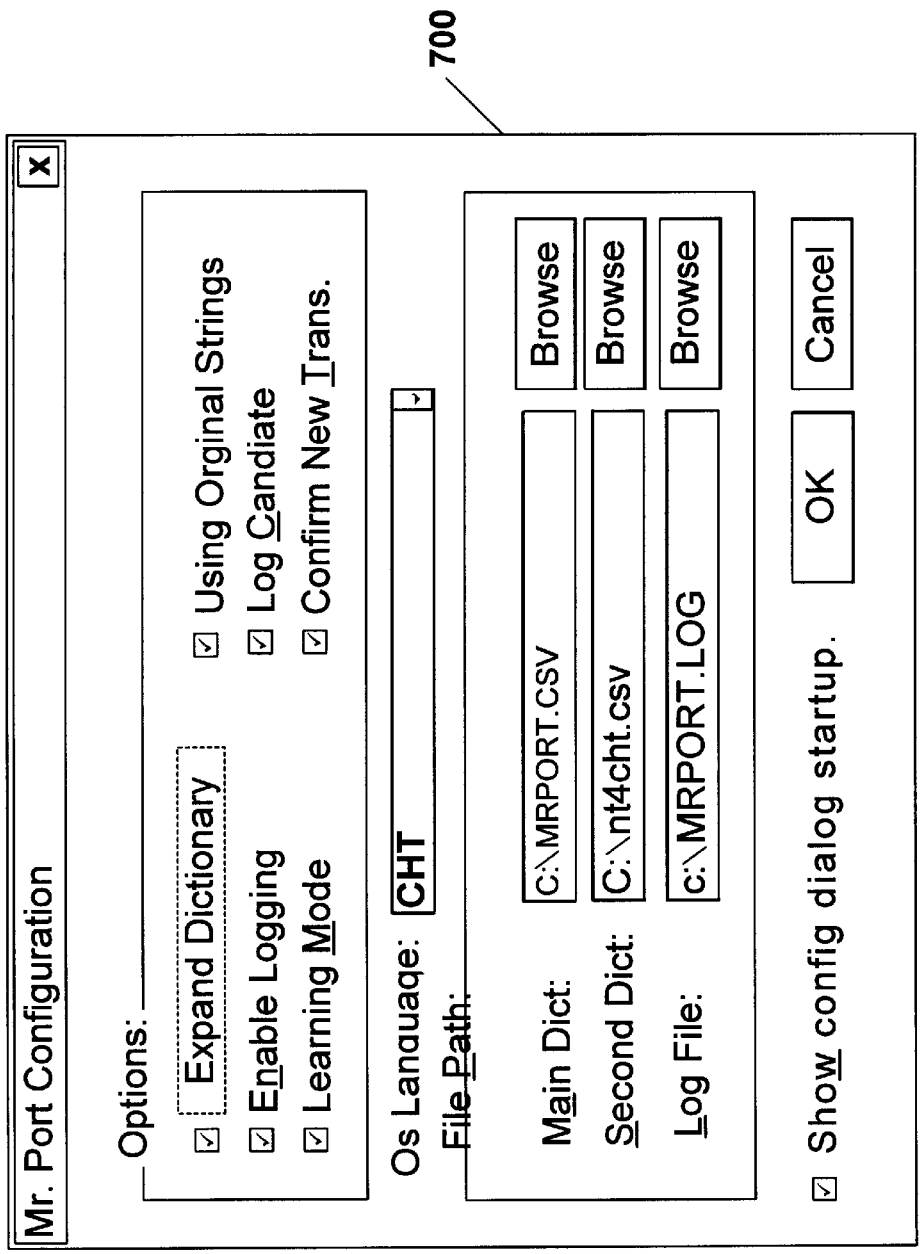
FIG. 7 is an exemplary GUI for providing the configuration settings of the porting engine of the present invention.

During the first run the test script 230, initial configuration settings may be set up using a GUI as shown in FIG. 7. These configuration settings may be stored in an Initialization (.INI) file or a plain-text file that contain configuration information as shown by way of example in FIG. 8. The .INI file is well known and is Windows-based applications to save information about preferences and operating environment.

The "Expand Dictionary" option allows that developer to control whether new command translations should be inserted in the internal dictionary. In the event that the translation is a temporary change, the developer many not what to change the master list in the dictionary. For example, if the test script is provided for an external beta site to test a printer, the developer may not want the dictionary affected.

The "Enable Logging" option allows the developer to control whether events in the porting engine, including translation candidates, error conditions, etc., should be logged. The logging feature provides valuable debugging information, however, it requires processing and disk storage space.

The "Using Original String" option allows that the original command strings to be tested. For example, for the "OK" function, the English "OK" may be the match using this option or other possible translations in the internal dictionary. This option may be turned off (in the example, to make sure all the "OK" button are translated into the localized language, and no English "OK" button allowed) when testing for "under-localization" bugs.

The "Log Candidate" option allows the porting engine to search all the command strings in the application program 215 when all of the translations in the internal and/or external dictionary fail to provide a match. For example, when looking for Menu "File/save" function in application program 215, if porting engine 220 could not find a matching from the translations in internal dictionary and external dictionary, then porting engine 220 will collect (query) all the menu items from application program 215, (most likely, one of them would be right translation for "File/Save") and can then call them as possible candidates for command string "File/Save". Logging these possible candidates would help developer debug the problem and allow the developer to copy or paste the candidates in internal dictionary.

The "Confirm New Translation" option allows the developer to confirm a new translation before use this translation or insert into internal dictionary.

For the first run of the test script 230, learning and logging modes may be turned on. The learning mode allows the dictionaries to be updated with translations that are not found in the dictionaries 205 and/or 210. The logging mode logs the simulation of the command strings on the application program and logs any errors or warnings. FIG. 9 illustrates a sample log 900 after the translation operation of the present invention has run. After the first one or more runs, the learning mode can be turned off so that the testing process is not disrupted. Log 900 will continue to identify any errors or warnings (resulting from a bug in the application program or the test script) that need to be corrected.

Figure 3:
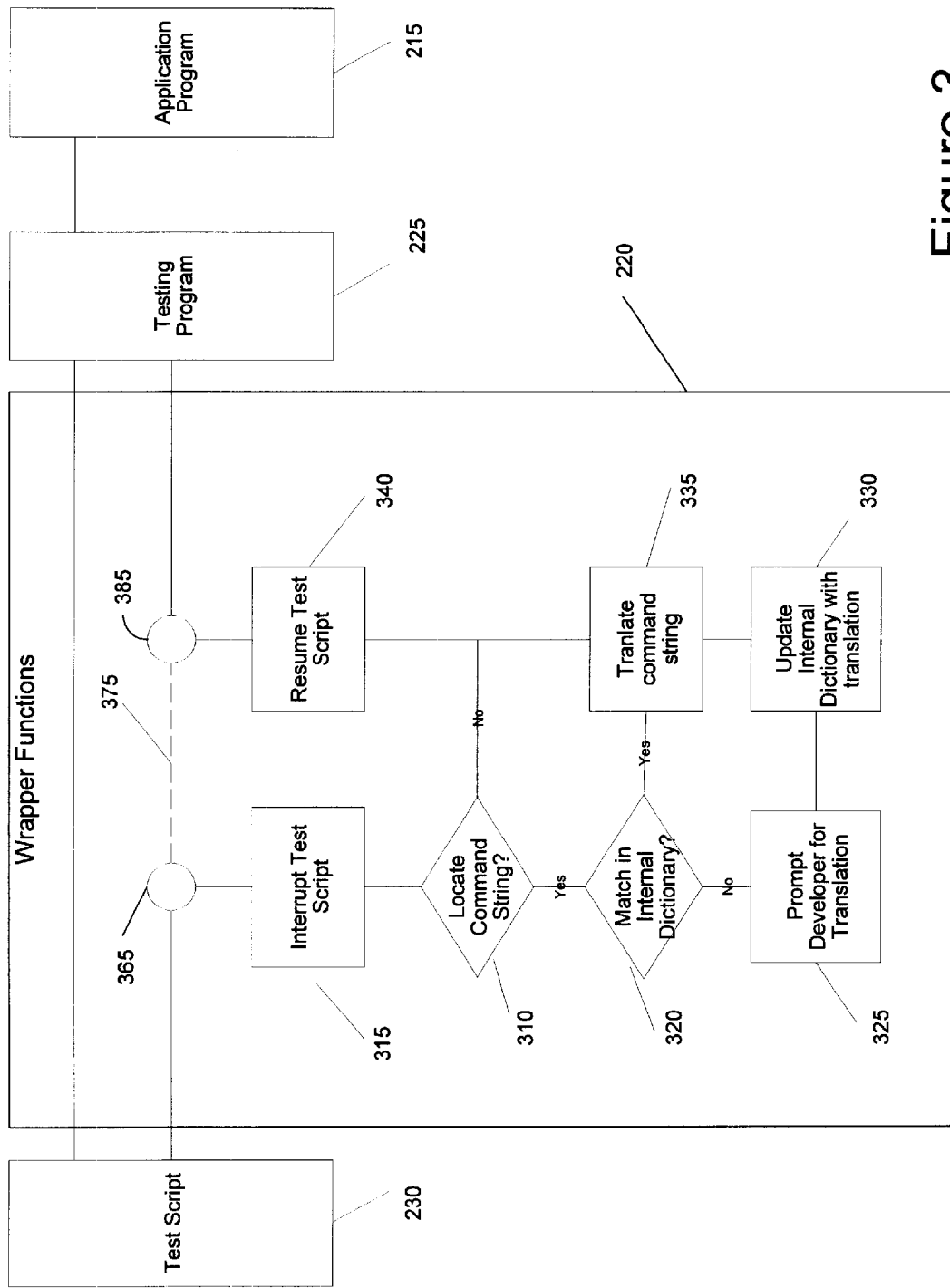
FIG. 3 is a flow diagram depicting the translation process in accordance with a preferred embodiment of the present invention where only an internal dictionary is used.

FIG. 3 is a flow diagram of the procedure for translating command strings in a test script 230 at run time in accordance with a preferred embodiment of the present invention, wherein an internal dictionary 205 is used to provide the translations for the command strings. When test script 230 is run, it calls testing program 225 directly which in turn drives application program 215 to be tested. The results are then passed directly back to test script 230. The wrapper function of the present invention 220 (in the add-on implement) will be a layer between test script 230 and testing program 225. All test functions use command strings will initiate the wrapper functions of present invention at step 365 to find translations that are passed to testing program 225 at step 385. Functions or commands not using command string will pass to testing program 225 directly in step 375.

First, the test script 230 is run to test the application program 215. The wrapper function, which is in porting engine 220, will monitors the test script 230 for a command string at step 365. If a command string is found, the test script 230 is interrupted at step 315 and the wrapper functions of the present invention are initiated. At step 320, the internal dictionary 205 is consulted for the command string. If the command string is located in the internal dictionary 205, the translation for the command string is identified and, at step 335, the command string is translated and provided to testing program 225 to simulate on the application program 215. The test script 230 is then resumed, at step 340, until the next token is identified.

Figure 5:
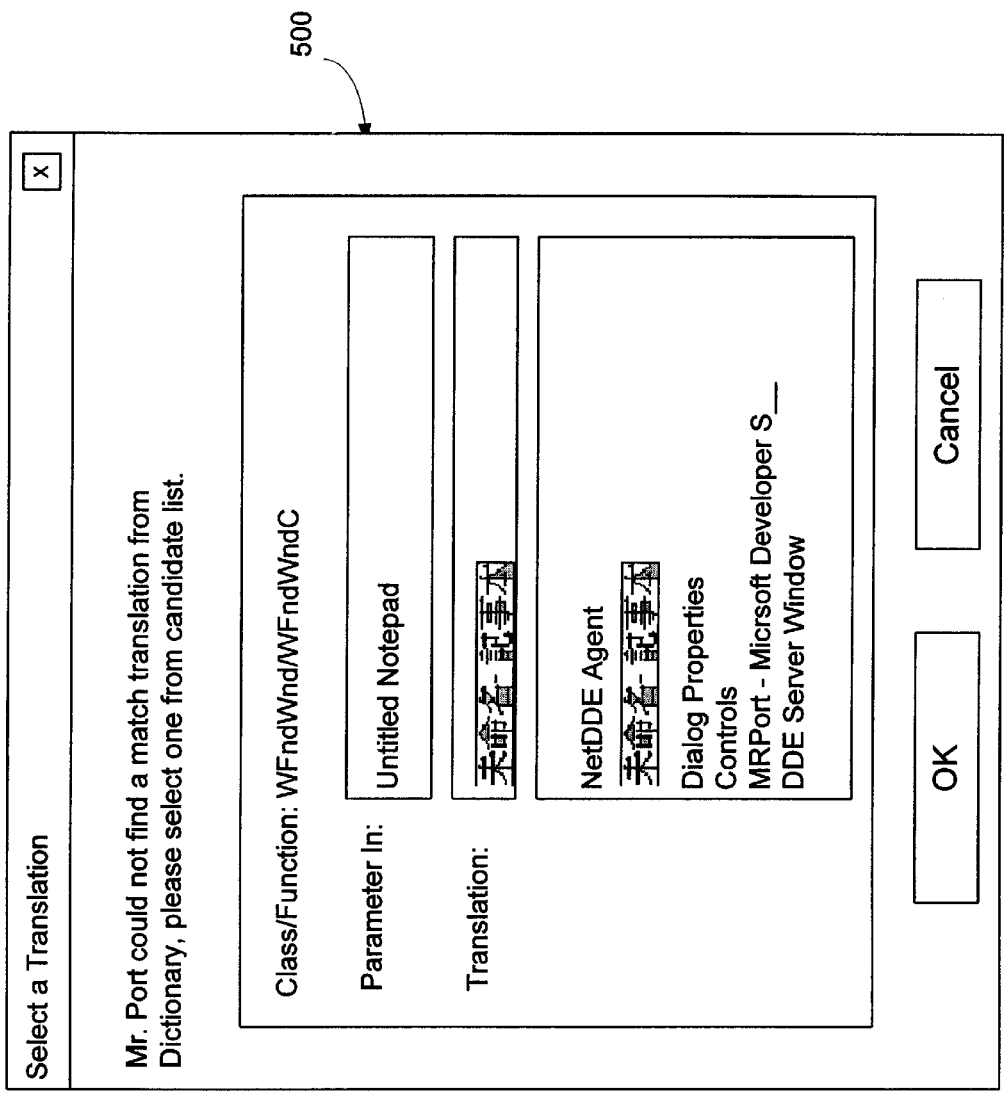
FIG. 5 is an exemplary Graphical User Interface (GUI) for querying the developer to provide a manual translation for a command string not found in one of the dictionaries.

If on the other hand, the command string is not found in the internal dictionary 205, the user may be prompted, at step 325, to provide the correct translation for the command string. FIG. 5 shows an exemplary graphical user interface (GUI) 500 for selecting the correct translation of the unknown command string. Once the developer provides the correct translation, it is added to the internal dictionary 205, at step 330, for future runs of the test script 230. The original string is substituted with the translated command string which is then operated on the application program 215 and the test script 230 is resumed until the next token is identified. This process is repeated until the test script 230 is completed.

The porting engine 220 present invention may also be implemented within the testing program.

Figure 4:
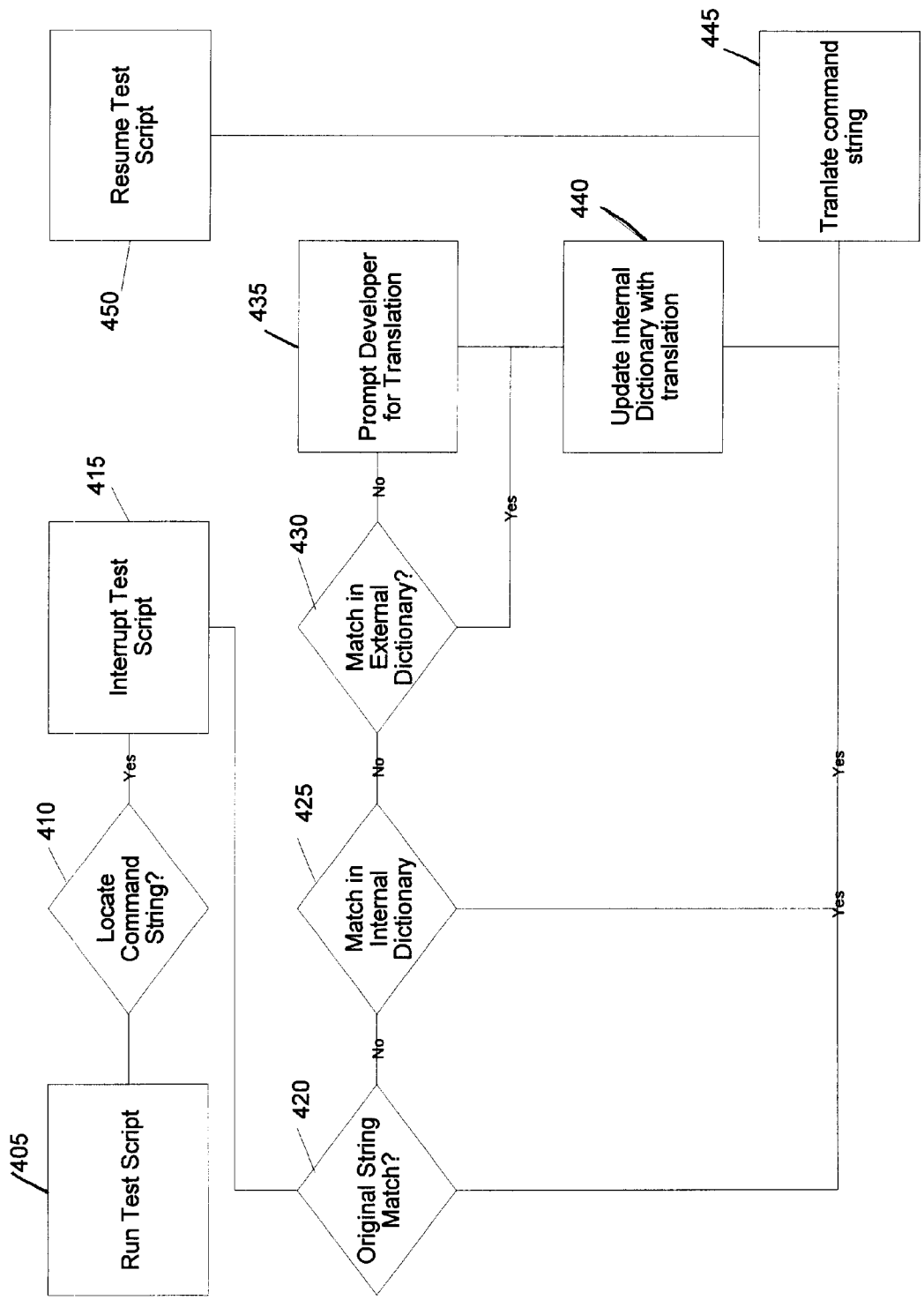
FIG. 4 is another flow diagram depicting the translation process in accordance with another preferred embodiment of the present invention where an internal dictionary and an external dictionary are used.

FIG. 4 is a flow diagram of the procedure for translating command strings in a test script 230 in accordance with another preferred embodiment of the present invention, wherein internal and external dictionaries 205 and 210 are used. The procedure is operated in a similar fashion except that a hierarchy is established for the dictionaries 205 and 210. The test script 230 is interrupted, at step 415, when a token is found. The first option is to try to match the original string, but only if the developer set the option to use original string in GUI 700. If this was not set as such, the next option is to find a match in internal dictionary and then external dictionary. The match functions are provided by testing programs 225 such as Visual Test. At step 425, the internal dictionary 205 is searched to locate a translation to the command string. If the command string is found, the translation is made at step 445. If the command string is not found in the internal dictionary 205, at step 430, the external dictionary 210 is searched. If the command string is found in the external dictionary 210, the translation is made at step 445, and this translation is added to the internal dictionary 205. If the command string is not found in the external dictionary 210, at step 435, the user is prompted to provide a translation (see FIG. 5). This translation is then added to the internal dictionary 205 at step 440. The translated command string is then used by the testing program 225 to operate on the application program 215 and the test script 230 is resumed until the next token is identified. This process is repeated until the test script 230 is completed.

The following is an exemplary source code disclosing the sorting order and control flow of the present invention.

```
BOOL CMrControl::FindMatchControl (LPSTR lpszCtrl, DWORD dwTimeout)
{
        //switch to 1-to-1 relation lookup
        if (lpszCtrl[0] == '$')
                return FindMatchControl_121 (lpszCtrl, dwTimeout);
        //search will search the dictionaries and find the matching chars
        //use m_pvfExists to search.
        //then store the string in the szFound;
        CTime startTime = CTime::GetCurrentTime();
        CTime endTime;
        CTimeSpan elapsedTime;
        //sometime when VT omit this timeout, it would be 0;
        //No longer than 7 hours, fix the timeout passing error
        if (dwTimeout == 0 || dwTimeout > 25200)
                dwTimeout = 7;
        BOOL bTimeout = FALSE;
        BOOL bNewQuery = TRUE;
        LONG lTimeout = (LONG)dwTimeout;
        BDOL bFound;
        //Search internal; call the existing function
        while (bTimeout != TRUE)
        {
                endTime = CTime::GetCurrentTime ();
                elapsedTime = endTime - startTime;
                bTimeout = elapsedTime.GetTotalSeconds() > = lTimeout;
                //Search the original string first
                //passing "=WND" and "@ORDINAL" cases.
                if (gOptions.m_bAllowOriginal || lpszCtrl[0] == '=' || lpszCtrl[0] == '@')
                        if (m_pvfExists(lpszCtrl, 0) )
                        {
                                strcpy(szFound, lpszCtrl);
                                return TRUE;
                        }
                }
                //Search the internal (main) dictionary,
                bFound = mainDict.SearchInternal (lpszCtrl, szFound);
                while (bFound)
                {
                        //VB TRUE = -1
                        //if (m_pvfExists(szFound, 0) == TRUE)
```

-continued

```
            if (m_pvfExists(szFound, 0))
                    return TRUE;
            bFound = mainDict.SearchInternal(NULL, szFound);
    }
    //search external (secondary) dictionary;
    if (gOptions.m_bAutoExpand)
    {
            bFound = mainDict.SearchExternal(lpszCtrl, szFound, bNewQuery);
            bNewQuery = FALSE;
            while (bFound)
            {
                    //insert if I found; otherwise return false
                    //VT define TRUE = -1;
                    //if(m_pvfExists(szFound, 0) == TRUE)
                    if (m_pvfExists(szFound, 0))
                    {
                            mainDict.AddNewToken(lpszCtrl, szFound);
                            return TRUE;
                    }
                    bFound = mainDict.SearchExternal (NULL, szFound, bNewQuery);
            }
    }
}
//Still Not Found, record the error
if (gOptions.m_bLogCandidate)
{
    sprintf(szLog, "--List Candidates for: %s (\"%s\"):\n",
                    m_strClassName,
                    lpszCtrl);
    DoLogFile(szLog);
}
//search candidates from screen.
if (gOptions.m_bLearningMode || gOptions.m_bLogCandidate)
{
    EnumCandidates (lpszCtrl, listCandidates);
}
//let user pick one.
if (gOptions.m_bLearningNode)
{
    if (PickCandidate(lpszCtrl, listCandidates, szFound) == TRUE)
    {
            //user has choosen a string.
            if (m_pvfExists(szFound, 0))
            {
                    mainDict.AddNewToken(lpszCtrl, szFound);
                    sprintf (szLog,
                            "- - - The translation \"%s\"->\"%s\" added to "
                            "main dictionary. \n",
                            lpszCtrl,
                            szFound);
                    DoLogFile (szLog);
                    return TRUE;
            }
            else
            {
                    //error log.
                    sprintf (szLog,
                            "- - - Error: The translation \"%s\"->\"%s\" "
                            "does not work!\n",
                            lpszCtrl,
                            szFound);
                    DoLogFile (szLog);
            }
    }
}
    return FALSE;
}
```

The present invention preferably incorporates a fuzzy match logic to account for situations where more than one translation exists for a command string. In this case, the translations in the original language of the test script 230 are given higher priority than the translations in the language of the application program 215. Each translation is then applied by the testing program 225 to find the translation that can be understood by the application program 215. To support testing of localization bugs, the user may enforce a one-to-one translation. Thus, even where more than one translation exists, only a single translation will be allowed. A one-to-one translation may be effectuated by including a string, for example "$", as part of the token in the command string. Thus, when a command string is identified, the porting engine 220 will also know that the command string can only have one translation. In a one-to-one translation mode, only the internal dictionary 205 is searched. But in the learning mode, where the translation is not found in the internal dictionary 205, translations from the external dictionary 210 may serve as candidates that the user may choose from using the GUI of FIG. 5.

Advantageously, a single test script 230 may be used to test different versions of the application program 215. A separate internal dictionary 205 is thereby created for each version of the application program 215. The internal dictionary 205 may thereby be distributed to the entire software development team and the same dictionary may be used for translations of test scripts for different application programs.

The internal dictionary 205 of the present invention requires only minimal storage since it stores only previously used command strings and those that are entered by the user. Though not required, the internal dictionary 205 is preferably loaded into memory at run time in B-Tree data structure (known in the art) to allow data strings to be instantly located and output, without having to wait for lengthy file sorts or searches. Internal dictionary 205 is preferably saved and updated on the disk in sorted order in comma separated value (CSV) format (east to load and save out to and from B-Tree format).

Advantageously, identification of the command string within the internal dictionary 205 can be relatively quicker than searching for the command string in the external dictionary 210. The internal dictionary 205 is therefore a preferred source than the external dictionary 210. Data in external dictionary 210 may be stored in Comma Separated Value (CSV) format sorted by the string order.

While the present invention has been described in connection with the illustrated embodiments, it will be appreciated and understood that modifications may be made without departing from the true spirit and scope of the invention. For example, those skilled in the art will appreciate that other procedures may be implemented than those disclosed in FIGS. 3 and 4 for translating command strings within the test script 230. By way of another example, other dictionary schemes and formats may be implemented.

What is claimed is:

1. A method in a computer system for testing an application program using a test script file, the test script file containing command strings in a first language, the application program having a second language, the method comprising the steps of:
    (a) interrupting the test script at run time to locate at least one command string within the test script;
    (b) identifying at run time a translation from the first language to the second language for the command string to provide at least one localized command string;
    (c) substituting at run time the command string with the localized command string; and
    (d) resuming the test script to test the application program using the localized command string.

2. The method according to claim 1, wherein steps (a) through (c) are performed for each command string within the test script.

3. The method according to claim 1, wherein the step of identifying includes the step of searching an internal dictionary for the translation.

4. The method according to claim 1, wherein the step of identifying includes the step of searching an external dictionary for the translation.

5. The method according to claim 1, wherein the step of identifying includes the step of querying a user for the translation.

6. The method according to claim 5, further comprising the step of (d) updating a dictionary with the translation provided by the user.

7. The method according to claim 1, wherein the step of identifying includes the steps of (i) searching an internal dictionary for the translation; and (ii) if the translation fails to be found in the internal dictionary, searching in an external dictionary for the translation.

8. The method according to claim 7, wherein the step of identifying further includes the step of (iii) if the translation fails to be found in the internal or external dictionaries, querying a user for the translation.

9. The method according to claim 8, wherein step of identifying further includes the step of (iv) if the user was queried, updating the internal dictionary with the translation provided by the user.

10. A computer-readable medium having computer-executable instructions for performing the steps of:
    (a) interrupting the test script at run time to locate at least one command string within a test script;
    (b) identifying at run time a translation from a first language to a second language for the command string to provide at least one localized command string;
    (c) substituting at run time the command string with the localized command string; and
    (d) resuming the test script to test the application program using the localized command string.

11. The computer-readable medium of claim 10, wherein the computer-executable instructions for performing steps (a) through (c) are performed for each command string within the test script.

12. The computer-readable medium of claim 10, further comprising at least one dictionary having a translation for at least one command string from the first language to the second language.

13. The computer-readable medium of claim 10, wherein the computer-executable instructions for performing the step of identifying includes the step of searching an internal dictionary for the translation.

14. The computer-readable medium of claim 10, wherein the computer-executable instructions for performing the step of identifying includes the step of searching an external dictionary for the translation.

15. The computer-readable medium of claim 10, wherein the computer-executable instructions for performing the step of identifying includes the step of querying a user for the translation.

16. The computer-readable medium of claim 15, wherein the computer-executable instructions further include instructions for performing the step of (d) updating a dictionary with the translation provided by the user.

17. The computer-readable medium of claim 10, wherein the computer-executable instructions for performing the step of identifying includes the steps of (i) searching an internal dictionary for the translation; and (ii) if the translation fails to be found in the internal dictionary, searching in an external dictionary for the translation.

18. The computer-readable medium of claim 17, wherein the computer-executable instructions for performing the step of identifying further includes the step of (iii) if the translation fails to be found in the internal or external dictionaries, querying a user for the translation.

19. The computer-readable medium of claim 18, wherein the computer-executable instructions for performing the step of identifying further includes the step of (iv) if the user was queried, updating the internal dictionary with the translation provided by the user.

20. The computer-readable medium of claim 10, further comprising an internal dictionary and an external dictionary, wherein the internal and external dictionaries have translations for at least one command string from the first language to the second language.

21. A computer-readable medium comprising in combination:
   (a) a porting engine having computer-executable components for interrupting a test script at run time to translate at least one command string to at least one localized command string and for causing the test script to test the application program using the localized command string, the command string having a first language and the localized command string having a second language, the command string being part of a test script for testing of an application program; and
   (b) at least one dictionary having at least one translation from the command string to the localized command string.

22. The computer-readable medium of claim 21, wherein the porting engine is a dynamic link library file.

23. The computer-readable medium of claim 22, wherein the dynamic link library file is an add-on to a testing program.

24. The computer-readable medium of claim 21, wherein the porting engine is incorporated within a testing program.

25. The computer-readable medium of claim 21, wherein the dictionary is a data file in Comma Separated Value format.

26. A method of testing an application program using a test script, the test script being in a first language and the application program being in a second language, the method comprising the steps of:
   (a) interrupting the test script at run time to identify a command string in the test script, the command string being in a first language;
   (b) searching at run time an internal dictionary for a translation for the command string, the translation being at least one localized command string having a second language;
   (c) if the translation is found in the internal dictionary, providing at run time at least one of the localized command string to the testing program; and
   (d) resuming the test script to test the application program using the localized command string.

27. The method of claim 26, further comprising the step of: (d) if the translation fails to be found in the internal dictionary, (i) prompting a user to provide the translation; and (ii) providing at least one of the localized command strings to the testing program.

28. The method of claim 27, wherein step (d) further comprises the step of (iii) updating the internal dictionary with the translation provided by the user.

29. The method of claim 26, further comprising the steps of:
   (d) if the translation fails to be found in the internal dictionary, searching an external dictionary for the translation; and
   (e) if the translation is found in the external dictionary, providing at least one of the localized command strings to the testing program.

30. The method of claim 29, further comprising the step of: (f) if the translation fails to be found in the external dictionary, (i) prompting a user to provide the translation; and (ii) providing at least one of the localized command strings to the testing program.

31. The method of claim 30, wherein step (f) further comprises the step of (iii) updating the internal dictionary with the translation provided by the user.

32. A method of testing an application program using a test script to run a testing program, the test script being in a first language and the application program being in a second language, the method comprising the steps of:
   (a) interrupting the test script at run time to identify a command string in the test script, the testing instruction being in a first language;
   (b) searching at run time an internal dictionary for a translation for the command string, the translation being at least one localized command string having a second language;
   (c) if the translation is found in the internal dictionary, applying at run time at least one of the localized command string to test the application program; and
   (d) resuming the test script to test the application program using the localized command string.

33. The method of claim 32, further comprising the step of: (d) if the translation fails to be found in the internal dictionary, (i) prompting a user to provide the translation; and (ii) applying at least one of the localized command strings to test the application program.

34. The method of claim 33, wherein step (d) further comprises the step of (iii) updating the internal dictionary with the translation provided by the user.

35. The method of claim 32, further comprising the steps of:
   (d) if the translation fails to be found in the internal dictionary, searching an external dictionary for the translation; and
   (e) if the translation is found in the external dictionary, applying at least one of the localized command strings to test the application program.

36. The method of claim 35, further comprising the step of: (f) if the translation fails to be found in the external dictionary, (i) prompting a user to provide the translation; and (ii) applying at least one of the localized command strings to test the application program.

37. The method of claim 36, wherein step (f) further comprises the step of (iii) updating the internal dictionary with the translation provided by the user.

* * * * *